Figure 5:
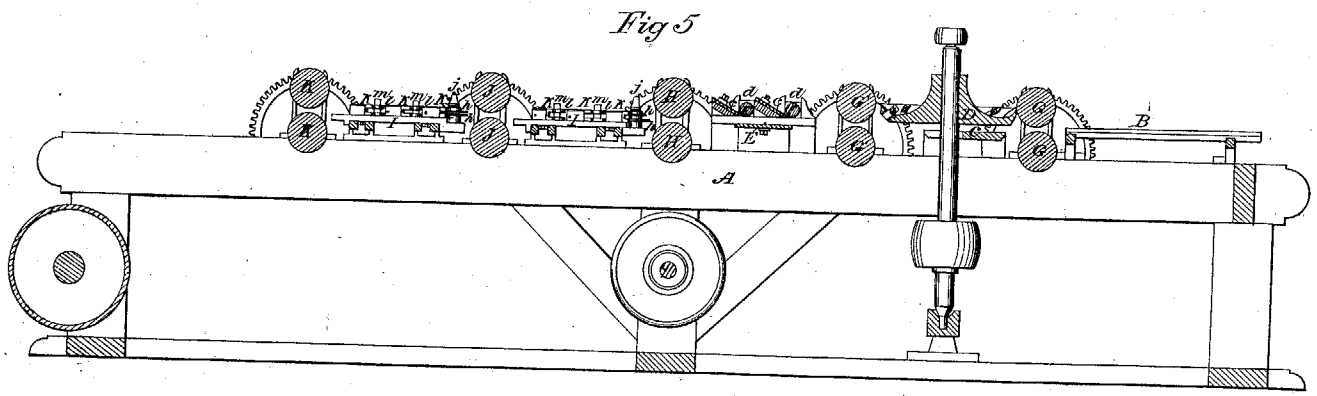

2 Sheets-Sheet 1.
Porrell, Barlow & Holden,
Wood Planing Machine.
No. 210. Reissued Mar. 9, 1852.
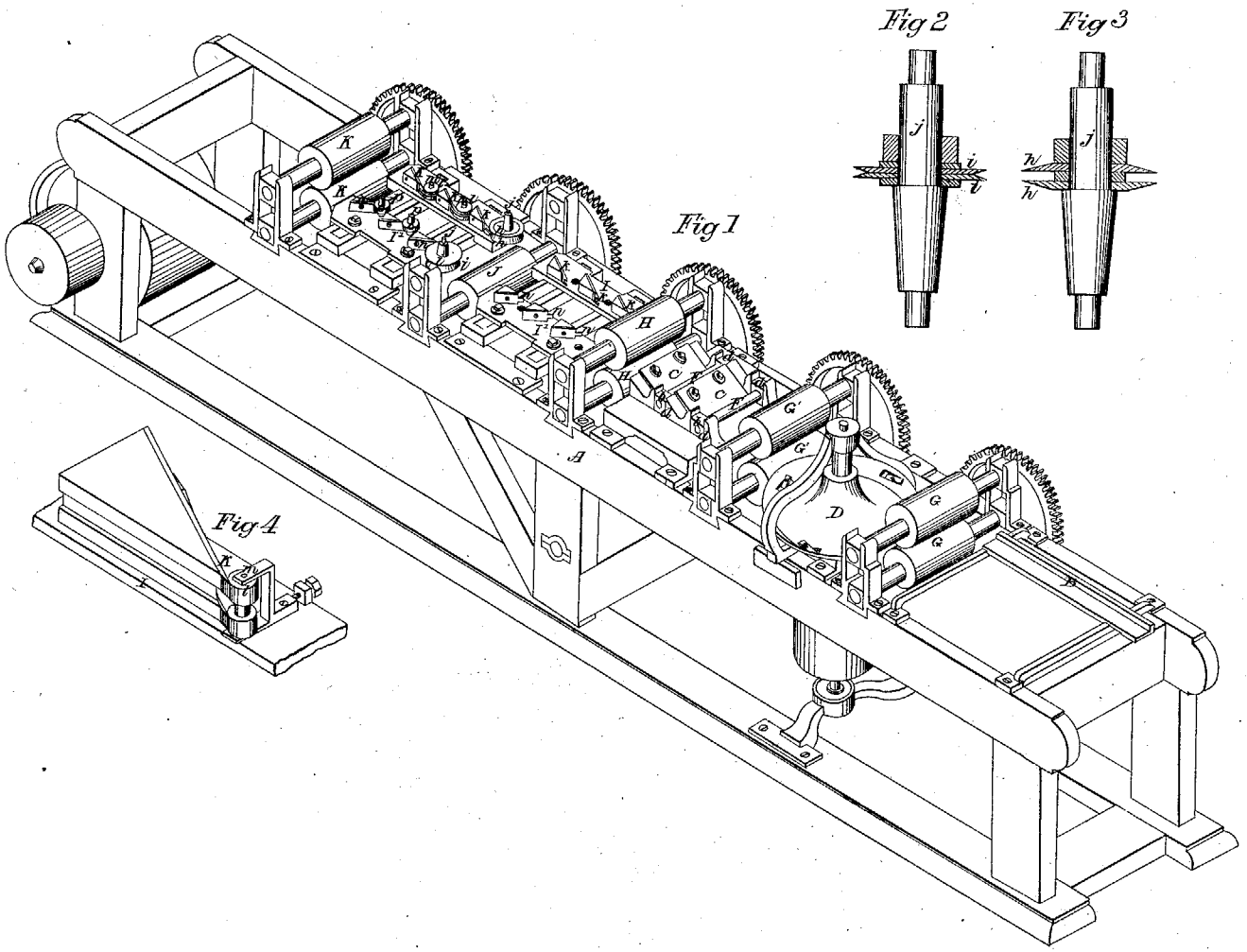
AM. PHOTO-LITHO. CO. N.Y. (OSBORNE'S PROCESS)

2 Sheets-Sheet 2.

Powell, Barlow & Holden,
Wood Planing Machine.

No. 210. Reissued Mar. 9, 1852.

AM. PHOTO-LITHO. CO. N.Y. (OSBORNE'S PROCESS)

UNITED STATES PATENT OFFICE.

ROBERT G. EUNSON, OF NEW YORK, N. Y., ASSIGNEE OF JOSEPH POWELL, NELSON BARLOW, AND EDWARD HOLDEN.

IMPROVEMENT IN MACHINES FOR PLANING, TONGUING, AND GROOVING.

Specification forming part of Letters Patent No. 4,983, dated February 27, 1847; Reissue No. 210, dated March 9, 1852.

*To all whom it may concern:*

Be it known that JOSEPH POWELL, NELSON BARLOW, and EDWARD HOLDEN, of the city and county of St. Louis, and State of Missouri, have invented a new and improved machine for planing boards or plank or other lumber, and tonguing and grooving the edges of the same, which they have denominated "Powell, Barlow & Co.'s Improved Planing-Machine," and that I, ROBERT G. EUNSON, of the city, county, and State of New York, have become the sole assignee of all right, title, and interest in and to the said invention; and I do hereby declare that the following is a full, clear, and exact description of the same, reference being had to the accompanying drawings, forming part of this specification, in which—

Sheet 1: Figure 1 is a perspective view of the machine. Figs. 2, 3, and 4 represent certain portions of the same detached and enlarged. Sheet 2: Fig. 5 is a longitudinal vertical section of the machine.

Similar letters of reference indicate corresponding parts in each of the several figures.

The nature of this invention relates, first, to a method of springing and holding or confining the board or plank to the bed-plate, while the thicknessing or reducing wheel or planes are operating upon it; second, to certain improved means of forming the tongue; and, third, to certain means of forming the groove.

A, Figs. 1 and 5, is the frame upon which the working parts of the machine are supported, constructed of longitudinal and transverse beams and posts in any suitable manner. Upon the frame is a guiding bed-piece, B, upon which the plank or board is laid and passed along to the feeding-rollers G G, which conduct it between the bed-plate C, (see Fig. 5,) and the rotating reducing cutter-wheel D to the feeding-rollers G′ G′. The axles of the feeding-rollers G G, immediately preceding the reducing-wheel, are not in a vertical line with each other, the upper roller of the pair being placed nearer to the shaft of the reducing-wheel than the lower one. The axles of the feeding-rollers G G′, immediately following the reducing-wheel, are also placed the same distance out of a vertical line, the upper roller being placed nearer to the shaft of the reducing-wheel than the lower one. These two pairs of feeding-rollers are thus arranged for the purpose of springing the board or plank to the bed-plate C, and retaining it in close proximity thereto as it advances, while the reducing-wheel is operating upon it; also, for holding the ends of the boards or plank to the bed-plate C, and preventing their being injured while passing from one pair of feeding-rollers to the other under the reducing-wheel. The reducing-wheel D brings the board or plank to an uniform and proper thickness, and is armed with cutters of the most suitable and proper form for effecting that object. From the feeding-rollers G′ G′ the board or plank passes on to a bed-plate, E, (see Fig. 5,) and under the yielding bar mouth-pieces F F and stationary smoothing knives or cutters *c c*, each two or more in number. By these a perfectly smooth surface is given to it as it passes under them to the next pair of feed-rollers H H. The yielding bar mouth-pieces shown in Figs. 1 and 5 consist of cylindrical metal bars or anti-friction rollers having journals *b b* at their furnished with boxes *d d*, which are fitted so as to slide in suitable vertical guides on either side of the bed-plate E, the axis of each roller being nearly in the same vertical plane with or immediately in front of the edge of one of the stationary knives or cutters *c c*. These yielding bar mouth-pieces are for the purpose of exerting a yielding or elastic pressure upon the surface of the plank or board sufficient to harden the surface left in a rough state by the reducing-cutters, and prevent the stationary smoothing knives or cutters from taking too deep a hold upon and tearing out splinters from it, but at the same time yield to inequalities in the surface, the element of the said pressure being the weight of the rollers and their boxes.

As the board or plank passes from the feeding-rollers H H, its edges are operated upon by the tonguing and grooving tools arranged upon the adjustable side plates, I I′, placed between the feeding-rollers H H and J J, and by a similar set of tools arranged upon similar plates placed between the feeding-rollers J J and K K. These tools consist of incising, spur, or edge cutters, and shaving cutters, and operate in the following manner: The incising-cutters shown consist of sharp-edged horizontal cutting-disks *h h* and *i i*, which are placed upon vertical axles *j j* in the front ends of the adjustable plates I I I′ I′. These disks are straight or have plane surfaces on one side, and are beveled off to a thin edge on the other, as may be best seen in the Figs. 2 and 3, where they are shown on an enlarged scale. The disks *h h* have their straight sides facing each other at the distance of the required thickness of the tongue to be formed. As the edge of the board or plank comes in contact with the disks, they cut into it, and are thereby caused to revolve, forming incisions for each side of the tongue as the board advances. Immediately beyond the disks *h h* there are arranged the (shaving) tonguing-cutters *k k k*, which remove the shoulders from each side of the incisions formed by the cutting-disks *h h*. Just in front of the tonguing-cutters *k k k* there are placed the grooved anti-friction rollers *l l*, (see enlarged view, Fig. 4,) playing loosely upon vertical axles *m m*, inserted into the plate I. The tongue, as it is formed on the edge of the board, passes into the grooves in the rollers *l l*. The periphery of these rollers at the sides of the grooves in the same presses on the shoulders on each side of the tongue a little in advance of the tonguing-cutters, and performs the same office in relation thereto that the rollers or bars F F do in connection with the stationary smoothing-cutters *c c*, above described. Opposite to the disks *h h* are placed the revolving cutting-disks *i i* on the front end of the plate I′. These cutters are arranged upon their axles with their beveled sides facing each other, and as they come in contact with the edge of the plank or board they revolve and cut incisions on each side of the channel or groove to be formed in it. Opposite to the tonguing-cutters *k k k* are arranged the shaving grooving-cutters *n n n* on the adjustable plate I′, which form the groove between the incisions made by the disks *i i*. Immediately in front of the grooving-cutters *n n n* anti-friction-rollers *o o* are placed. These rollers play loosely on vertical axles *p p*, and are so adjusted as to press upon the bottom of the groove in advance of the tonguing-cutters, having the same effect in relation thereto that the rollers or bars F F have in relation to the stationary smoothing-cutters *c c*, before described.

Two series of tonguing and grooving cutters are shown, but another or other series may be added should it be deemed expedient. As many may be employed as will suffice to cut the tongues and grooves to the required depth.

In Fig. 1 of the drawings the cutting-disks *h h* and *i i*, and the rollers *l l* and *o o*, and their axles are omitted for the purpose of showing other parts more distinctly, as is also the upper feeding-roller, J; but as corresponding parts are seen in other parts of the same figure, their arrangement and position will be fully understood.

In none of the methods heretofore made use of for the purposes of tonguing boards or plank was there any provision made for cutting more than one side of the rabbets, which form the tongue, nor in any of the methods of grooving was there any provision for cutting the sides of the groove, and consequently an effect has been produced on the sides upon which the cutters did not act which may be described as tearing the edges of the shavings from the wood. This was particularly the case in cutting out the groove. The incising-cutters above described are designed to obviate this difficulty. The incision which they make on each side of the tongue and in each side of the groove separates the edges of the shavings from the wood, and not only makes the sides smooth and perfect, but enables the shaving-cutters to perform their work at a less expense of power.

The incising-cutters may be used in other forms beside that of the revolving disk—as, for instance, a similar disk kept stationary would produce the same result, as also would a revolving or stationary spur-cutter with incising-teeth, or stationary or moving, straight or curved edge-cutter, or a row of spur-teeth, arranged in a straight or curved line, provided the form of the transverse section of the edge in either case is of suitable form to make the necessary incision. Any incising-edge would produce the same effect and be equivalent to the incising-disk. The disk is perhaps the most convenient form for operating, and works with less friction, but the other forms would operate equally or nearly as well.

The construction of this planing-machine may be so varied that the planks or boards may be made to pass through it on their sides or edges, and that when they are passed through the machine on their sides the reducing-wheel and stationary planing-cutters can be arranged so as to operate either upon the upper or under surface, as may be deemed expedient. In practice it is found better to have the parts of the machine so arranged as to pass the boards or plank through the same upon their sides, and to operate upon their under surface.

The reducing-wheel D and the respective series of feeding-rollers are connected to and receive motion from a driving-shaft in any convenient manner.

What I claim as the invention of the aforesaid JOSEPH POWELL, NELSON BARLOW, and EDWARD HOLDEN, and what I desire to secure by the reissue of the Letters Patent granted originally to them, is—

1. The combination of the pairs of feeding-rollers G G and G′ G′ with the bed-plate C and the rotating reducing-wheel D, substantially in the manner and for the purpose herein set forth—viz., the placing the axles of the pair of feeding-rollers G G preceding the reducing cutter-wheel, and the axles of the pair of feeding-rollers G′ G′ immediately following the same, respectively out of a vertical line with each other, thereby bringing the upper roller of each pair nearer to the shaft of the reducing-wheel than the lower one, for the purpose of spring the board or plank to the bed-plate, as herein more particularly described.

2. In making the rabbet by which the tongue is formed, the employment of a series of incising-cutters, in combination with stationary planing tonguing-cutters, the several cutters being so arranged as to act upon both sides of the angle of the rabbet simultaneously or alternately and cut the shavings from both the said sides, so as to form at one operation a tongue, both of whose sides and shoulders have been subjected to the action of cutting edges, substantially as herein set forth.

3. In forming the groove, the employment of a series of incising-cutters, in combination with stationary planing grooving-cutters, substantially as described, for forming the tongue, being arranged so as to cut upon both sides and the bottom of the groove, as set forth.

ROBERT G. EUNSON,

*Assignee of Joseph Powell, Nelson Barlow, and Edward Holden.*

Witnesses:

S. H. WALES,

THOS. MAHON.